(12) United States Patent
Lai

(10) Patent No.: US 8,341,757 B2
(45) Date of Patent: Dec. 25, 2012

(54) ELECTRONIC DEVICE AND METHOD FOR RECORDING DISASSEMBLE HISTORY INFORMATION AND JUDGING THE ELECTRONIC DEVICE THEREOF

(75) Inventor: Jin-Shi Lai, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 929 days.

(21) Appl. No.: 12/411,412

(22) Filed: Mar. 26, 2009

(65) Prior Publication Data

US 2009/0271878 A1 Oct. 29, 2009

(30) Foreign Application Priority Data

Apr. 24, 2008 (CN) .......................... 2008 1 0301282

(51) Int. Cl.
*G06F 11/00* (2006.01)
*G06F 7/04* (2006.01)

(52) U.S. Cl. .............. 726/34; 726/35; 726/36; 713/323; 713/324; 713/330; 713/340

(58) Field of Classification Search ..................... 726/34
See application file for complete search history.

(56) References Cited

U.S. PATENT DOCUMENTS

| 4,678,880 A | * | 7/1987 | Koizumi et al. | 200/513 |
| 7,613,934 B2 | * | 11/2009 | Hou et al. | 713/300 |
| 2005/0254390 A1 | * | 11/2005 | Inokuchi et al. | 369/59.23 |
| 2006/0263650 A1 | | 11/2006 | Haraguchi et al. | |

FOREIGN PATENT DOCUMENTS

CN 101106582 A 1/2008

* cited by examiner

*Primary Examiner* — Longbit Chai
(74) *Attorney, Agent, or Firm* — Altis Law Group, Inc.

(57) ABSTRACT

An exemplary electronic device includes a detecting component and a storage unit. The detecting component generates detecting signals when the electronic device has been disassembled. The storage unit stores disassemble history information based on detecting signals received from the detecting component.

15 Claims, 10 Drawing Sheets

ELECTRONIC DEVICE AND METHOD FOR RECORDING DISASSEMBLE HISTORY INFORMATION AND JUDGING THE ELECTRONIC DEVICE THEREOF

BACKGROUND

1. Field of the Invention

The present disclosure relates to electronic devices, and more particularly to an electronic device and a method for recording disassemble history information of the electronic device and judging the electronic device thereof.

2. Description of Related Art

Electronic devices, such as cellular phones, notebook computers, and digital cameras typically have a limited warranty period after the date of purchase. During such a limited warranty period, only manufacturers or dealers have proper authority to repair the electronic devices or replace any components of the electronic devices.

When an electronic device malfunction, the user may take the electronic device to an unauthorized party to fix or repair. However, the unauthorized party may further damage the electronic device and subsequent within-warranty repairs by authorized parties may be gratuitously costly to the authorized party.

Therefore, it is desired to provide an electronic device and method to record disassemble history information of the electronic device.

DETAILED DESCRIPTION

Figure 1:
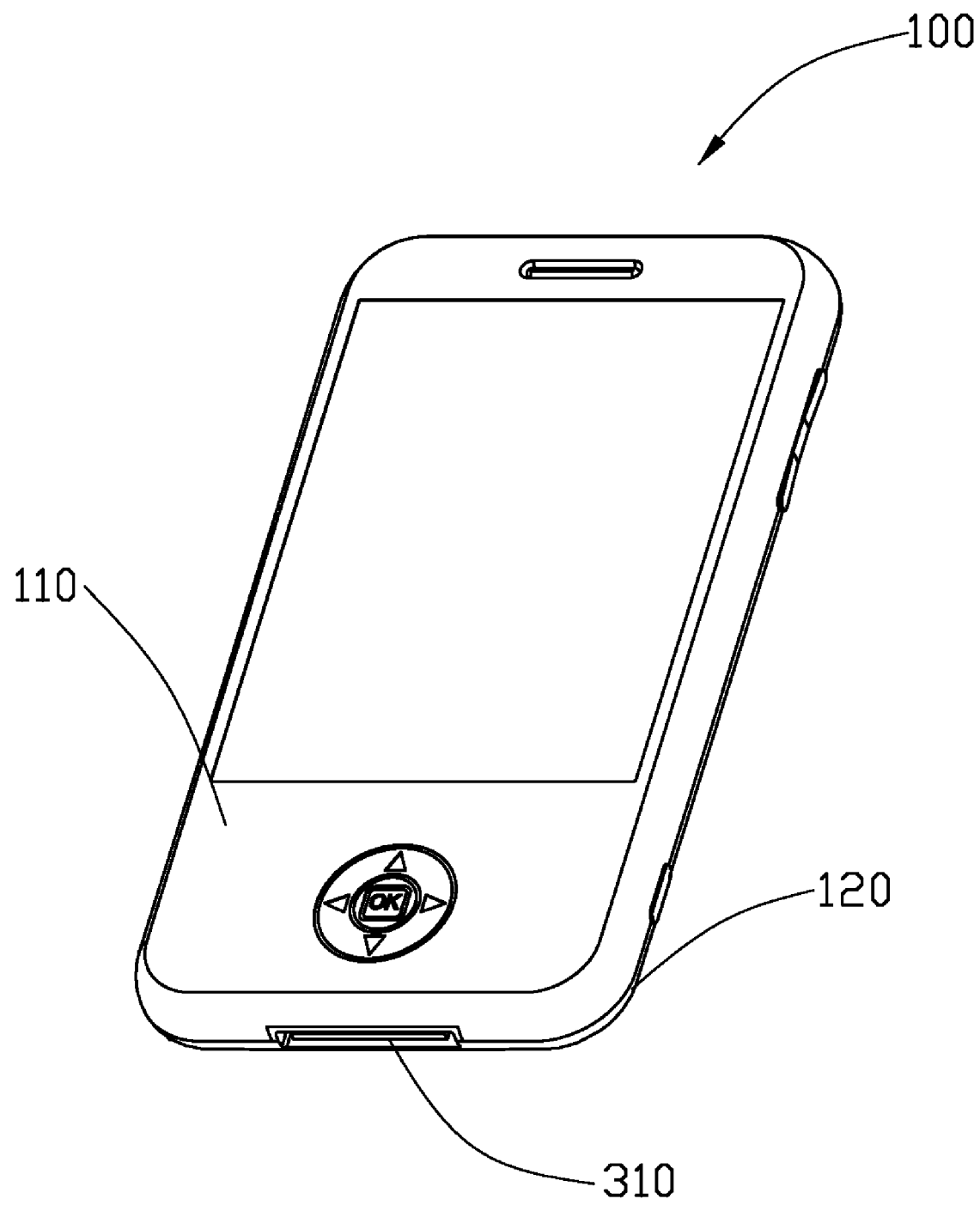
FIG. 1 is a perspective view of an electronic device.

Referring to FIG. 1, a perspective view of an electronic device 100 in accordance with an exemplary embodiment is shown. The electronic device 100 may be a cellular phone or a personal digital assistant (PDA). In other embodiments, the electronic device 100 may be a notebook computer, a digital camera, or a media player. The electronic device 100 generally includes a first housing 110 and a second housing 120. The first housing 110 is detachably fastened to the second housing 120. The electronic device 100 further includes an interface 310 for communicating with other electronic devices. In the exemplary embodiment, the interface 310 is a universal serial bus (USB) port to facilitate data transfer with another electronic device via a USB cable. In other embodiments, the interface 310 may be a wireless module, such as a Bluetooth® module to facilitate wireless data transfer with another electronic device.

Figure 2:
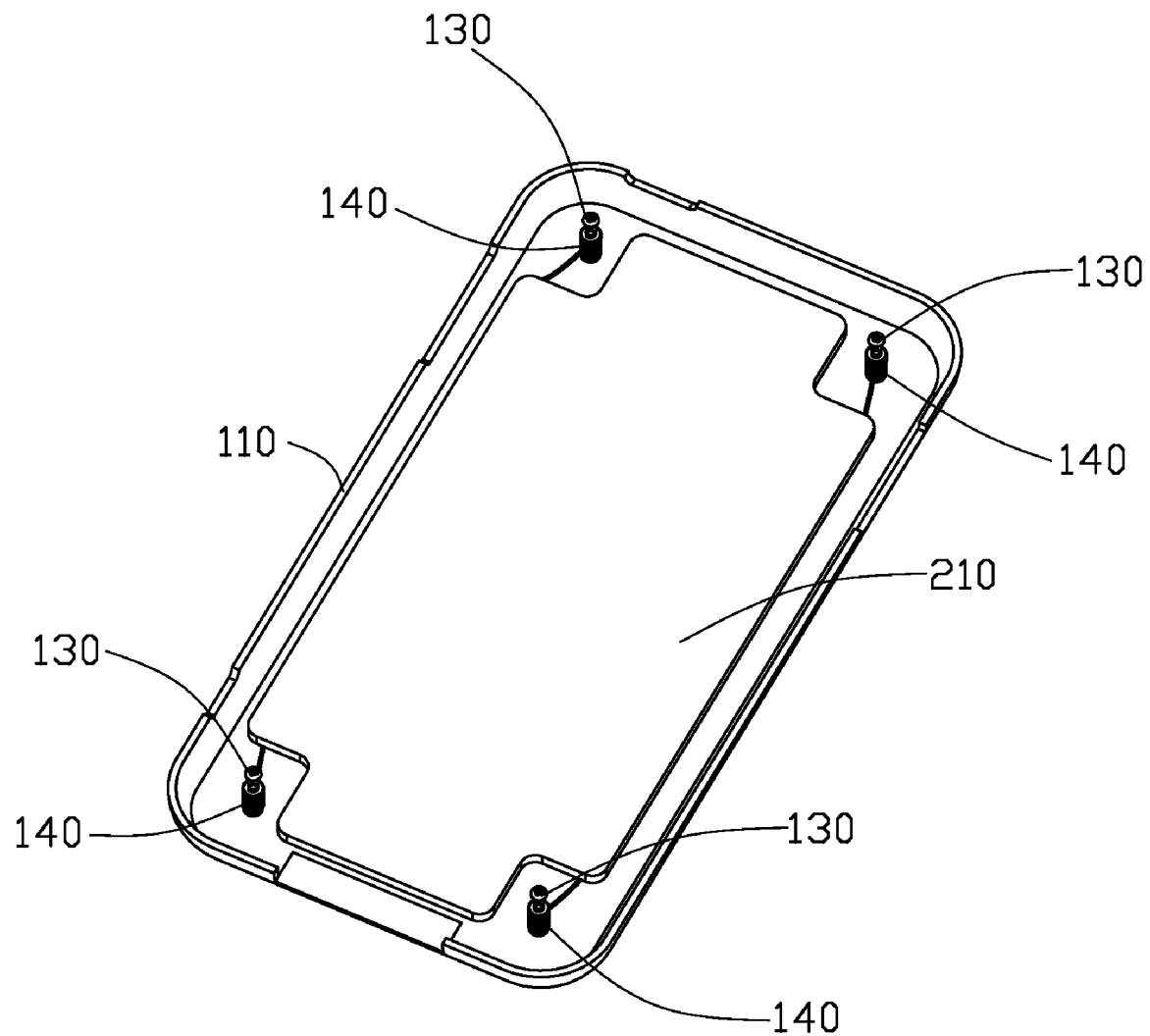
FIG. 2 is an internal view of the electronic device having a detecting component in accordance with a first exemplary embodiment.

Referring to FIG. 2, an internal view of the electronic device 100 is shown. The electronic device 100 further includes a main board 210, a plurality of screws 130, and a plurality of detecting components 140. The main board 210 is received in an accommodating space cooperatively defined by the first housing 110 and the second housing 120. The plurality of screws 130 are used to secure the first housing 110 together with the second housing 120. The detecting component 140 is configured to detect whether one of the plurality of screws 130 are detached from the electronic device 100. In the exemplary embodiment, only four screws 130 and four corresponding detecting components 140 are shown. In other embodiments, only one screw 130 and one detecting component 140 may be applicable.

Figure 3:
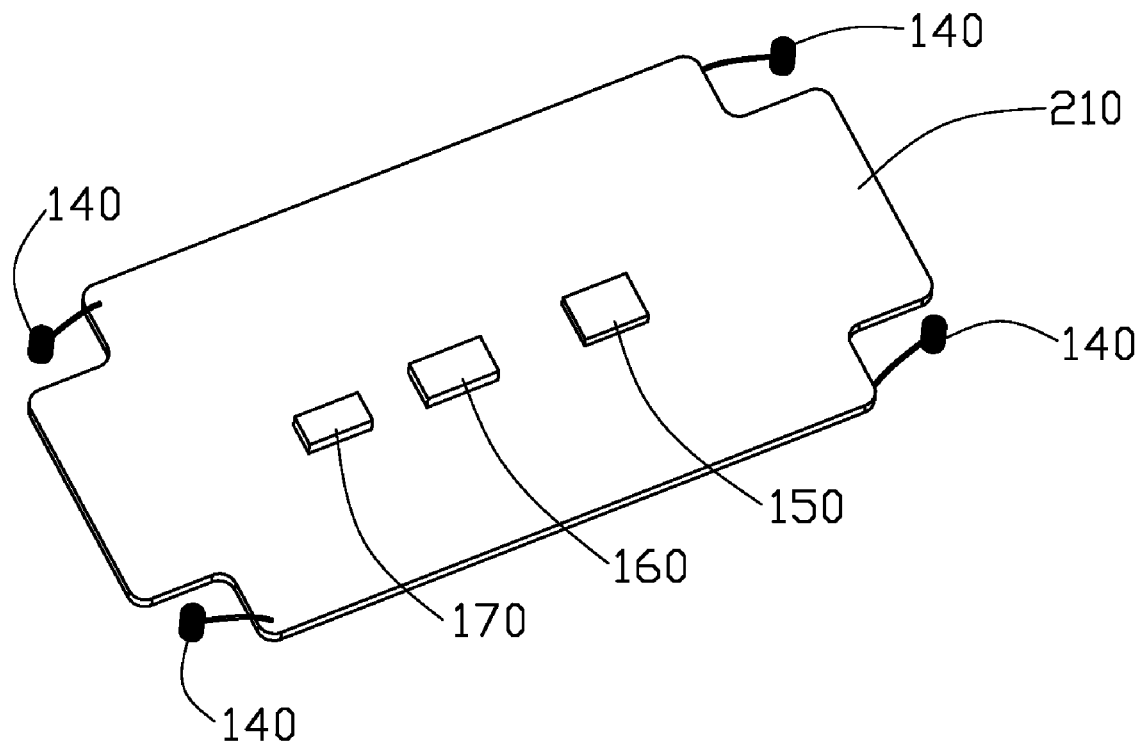
FIG. 3 is a perspective view of the detecting component in accordance with the first exemplary embodiment.

Further referring to FIG. 3, a perspective view of the main board 210 in association with the plurality of detecting components 140 is shown. In a first exemplary embodiment, the detecting component 140 is a coil. The coil 140 is electrically coupled to the main board 210. The main board 210 is further mounted with a storage unit 150, an encoding unit 160, and a battery 170. The battery 170 is configured for supplying electrical power to the storage unit 150 and the encoding unit 160. The storage unit 150 is coupled to the interface 310 for transmitting/receiving data with the interface 310.

Figure 4:
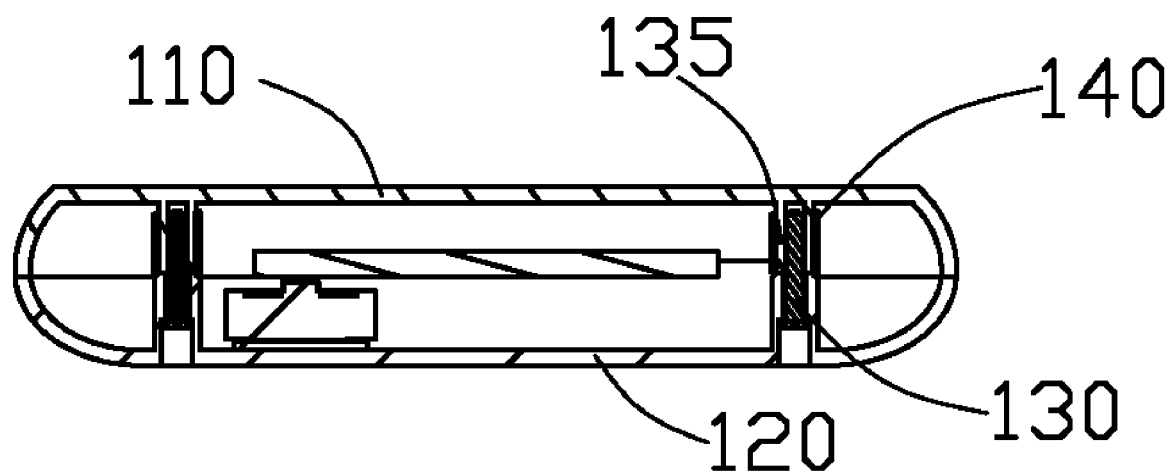
FIG. 4 is a cross-sectional view of the electronic device having the detecting component in accordance with the first exemplary embodiment.

Further referring to FIG. 4, a cross-sectional view of the electronic device 100 is shown. The electronic device 100 further includes a plurality of protrusions 135. In the exemplary embodiment, the protrusions 135 are disposed in the first housing 110. In other embodiments, the protrusions 135 may be disposed in the second housing 120. Each protrusion 135 is configured to sleeve a coil 140 correspondingly. Furthermore, each of the protrusions 135 is fixable with a screw 130 correspondingly. As a result, the first housing 110 can be secured to the second housing 120. In this case, each screw 130 is engaged with each coil 140 correspondingly.

When one of the screws 130 is unscrewed to remove the first housing 110 from the second housing 120, the screw 130 will disengage from the coil 140. As a result, inductive signals are generated. The inductive signals indicate that the electronic device 100 is being disassembled. The encoding unit 160 encodes the inductive signals according to a predetermined algorithm to generate disassemble history information. The disassemble history information is then stored in the storage unit 150.

Figure 5:
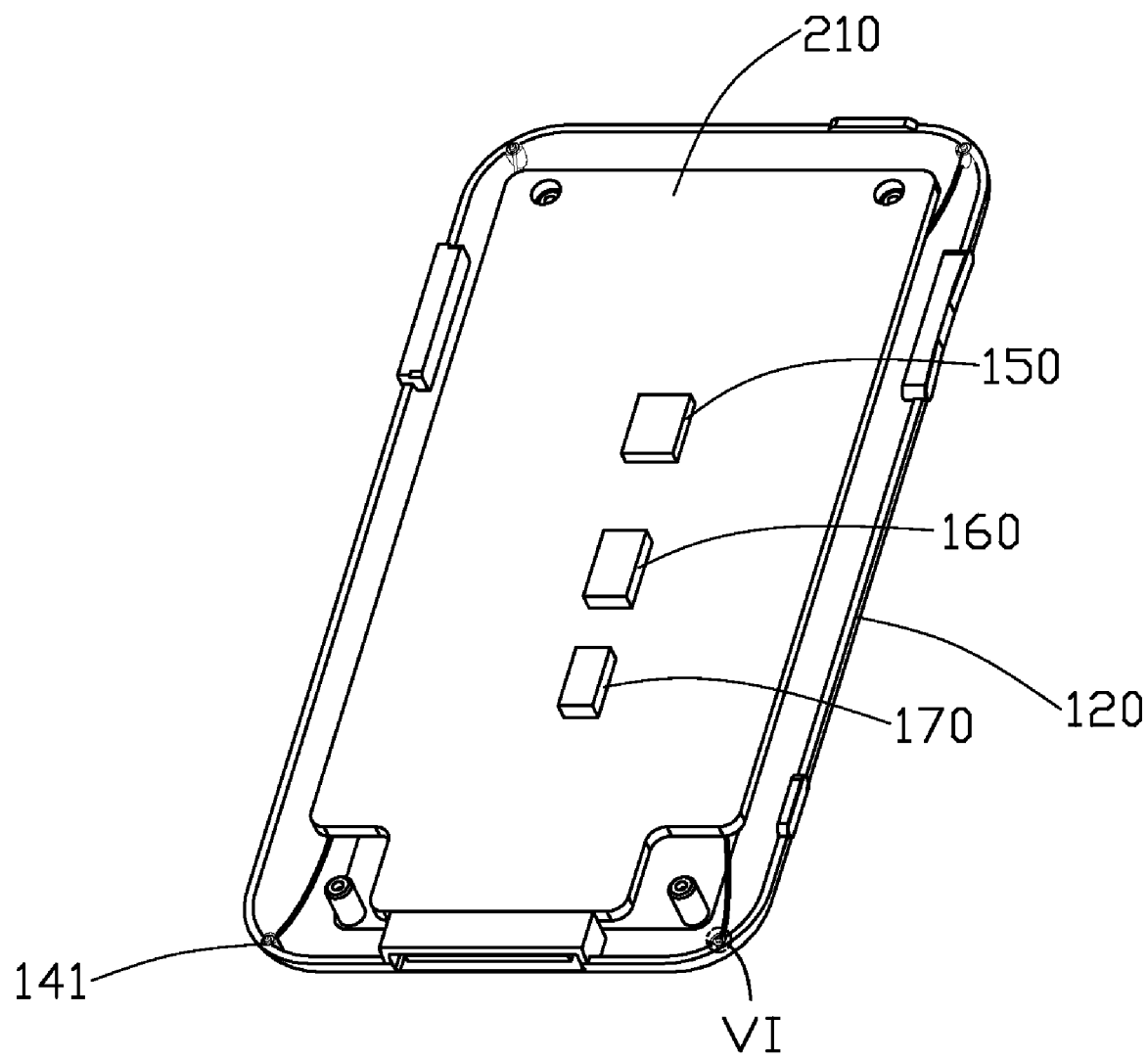
FIG. 5 is an internal view of the electronic device having a detecting component in accordance with a second exemplary embodiment.
Figure 6:
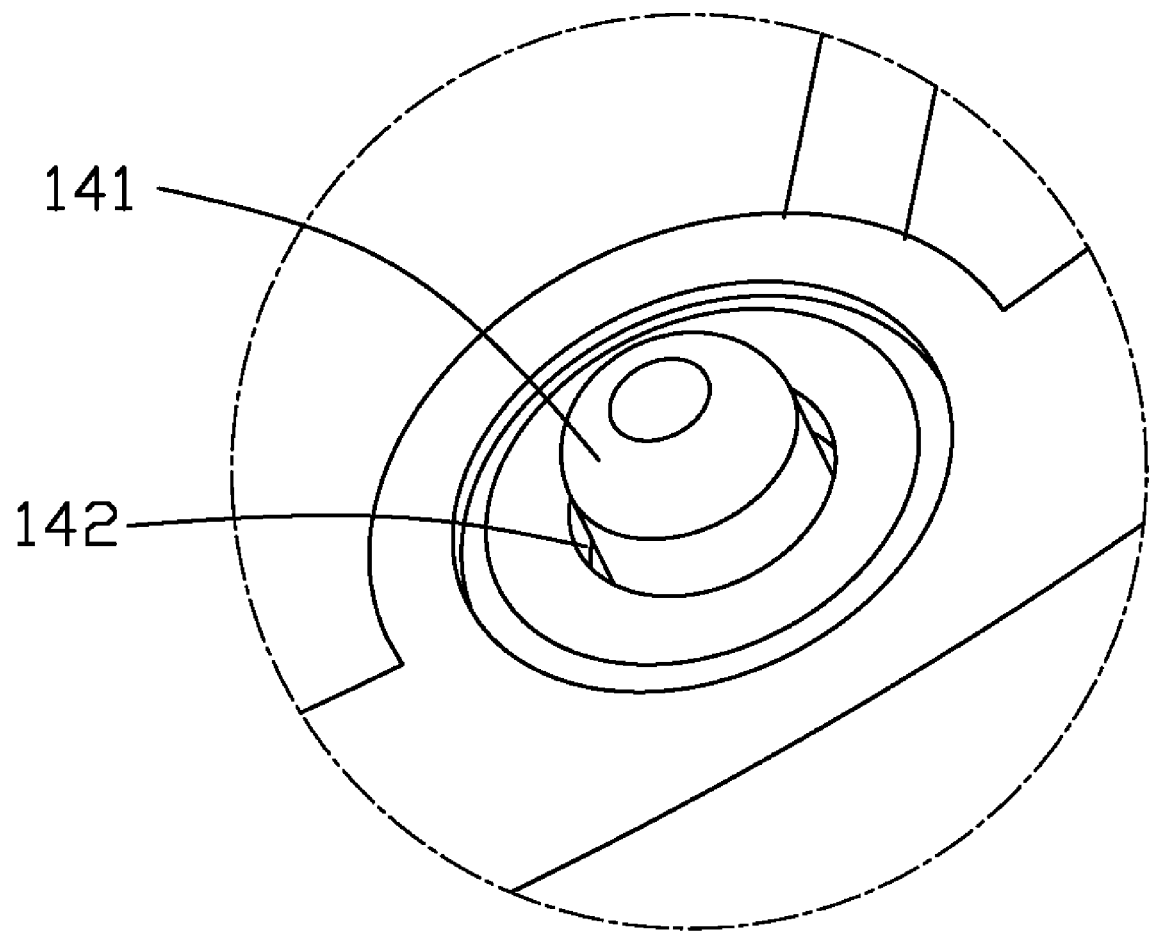
FIG. 6 is an enlarged view of the detecting component of FIG. 5.
Figure 7:
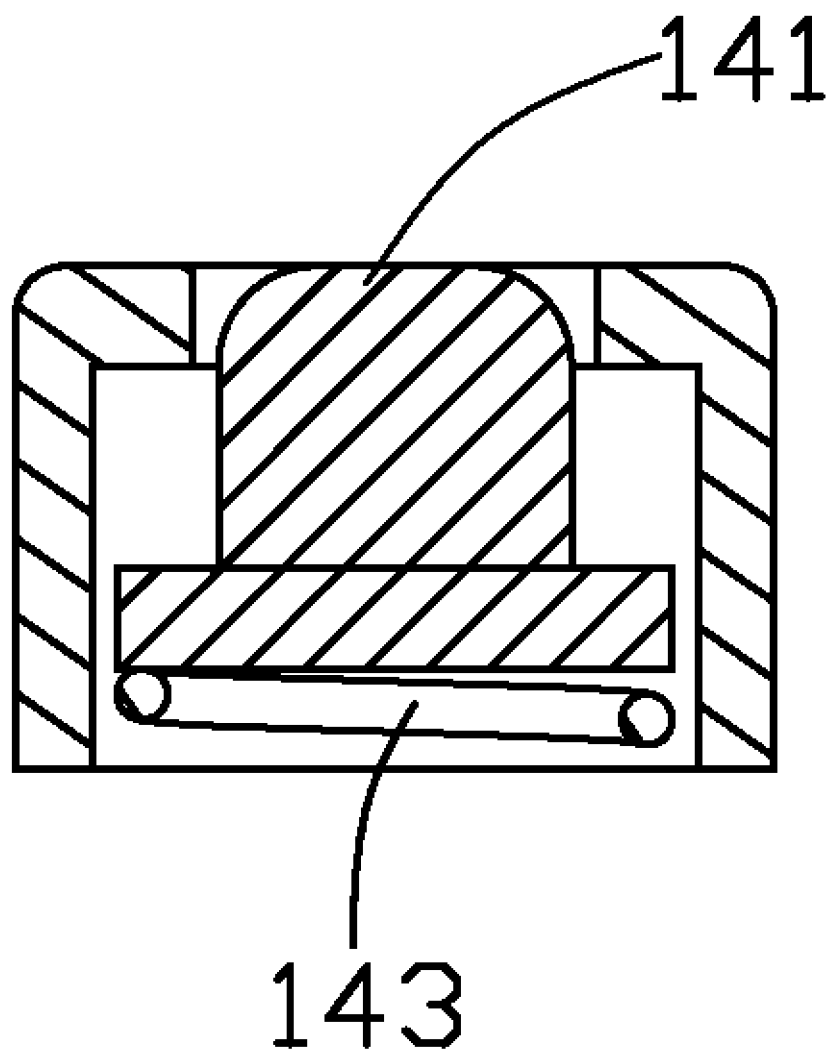
FIG. 7 is a sectional, side view of the detecting component, which is operated in a first state.

Referring to FIG. 5, an internal view of the electronic device 100 in accordance with a second embodiment is shown. In this exemplary second embodiment, a push switch 141 represents the detecting component 140. Also referring to FIG. 6 and FIG. 7, each push switch 141 is disposed in a corresponding receiving cavity 142 defined in the second housing 120 of the electronic device 100. The push switch 141 is electrically coupled to the main board 210. Each of the push switch 141 transmits pulse signals to the main board 210 when actuated.

Figure 8:
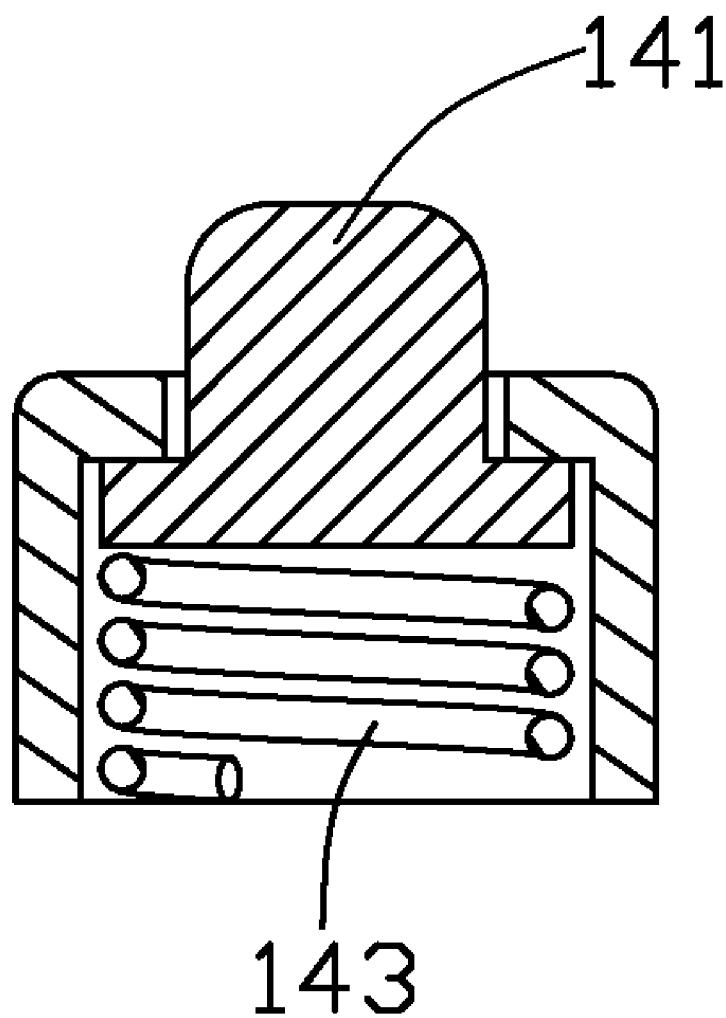
FIG. 8 is a sectional, side view of the detecting component, which is operated in a second state.

When the electronic device 100 is assembled, the first housing 110 and the second housing 120 actuates the push switch 141 to a first state. Further referring to FIG. 7, at the same time, a coil spring 143 is compressed by the push switch 141 to store elastic energy. Normally, the first state is configured to be an OFF state. Referring to FIG. 8, when the electronic device 100 is disassembled, the first housing 110 and the second housing 120 are separated, such that the push switch 141 is actuated by the coil spring 143 to change from the first state to a second state or from the OFF state to an ON state, generating pulse signals correspondingly. The encoding unit 160 encodes the pulse signals according to a predetermined algorithm to generate disassemble history information. The disassemble history information is stored in the storage unit 150.

Figure 9:
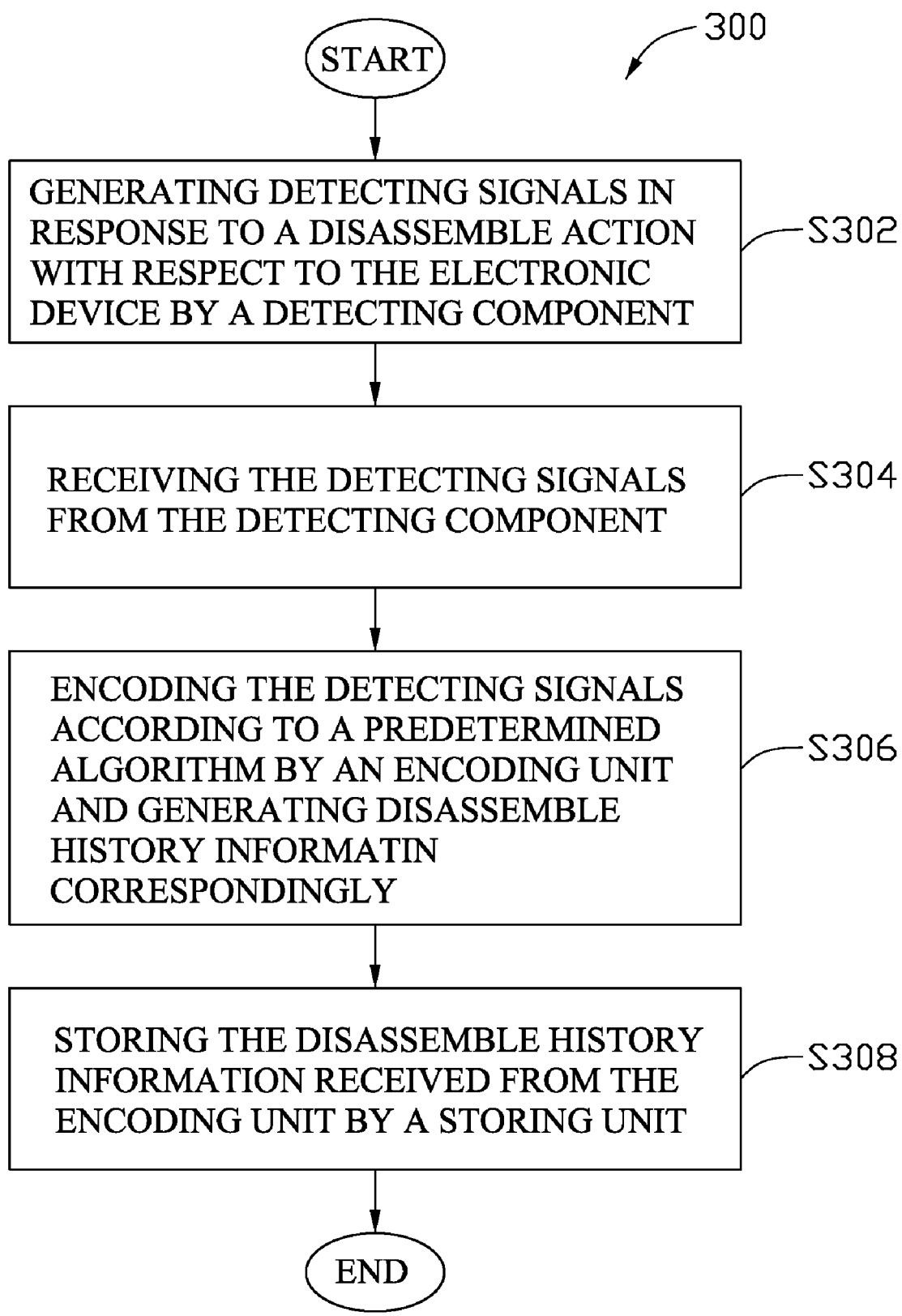
FIG. 9 is a flow chart illustrating various actions of a method for recording disassemble history information of an electronic device in accordance with a first exemplary embodiment.

Referring to FIG. 9, a flowchart illustrating a method 300 for recording disassemble history information of the electronic device 100 is shown. The method 300 includes the following blocks, each of which is tied to various components contained in the electronic device 100 as shown in FIG. 1.

At block S302, the detecting component 140 generates detecting signals in response to a disassemble action with respect to the electronic device 100. The disassemble action may be applied to disassemble at least one component of the electronic device 100 or separate the electronic device 100 to two portions. In a first embodiment, the detecting component 140 is a coil. The coil 140 generates inductive signals when a screw 130 is disengaged from the coil 140. In a second embodiment, the detecting component 140 is represented by a push switch 141. The push switch 141 generates pulse signals when the push switch 141 is actuated.

At block S304, the encoding unit 160 receives the detecting signals from the detecting component 140.

At block S306, the encoding unit 160 encodes the detecting signals according to a predetermined algorithm and generates disassemble history information correspondingly.

At block S308, the storage unit 150 stores the disassemble history information received from the encoding unit 160.

Figure 10:
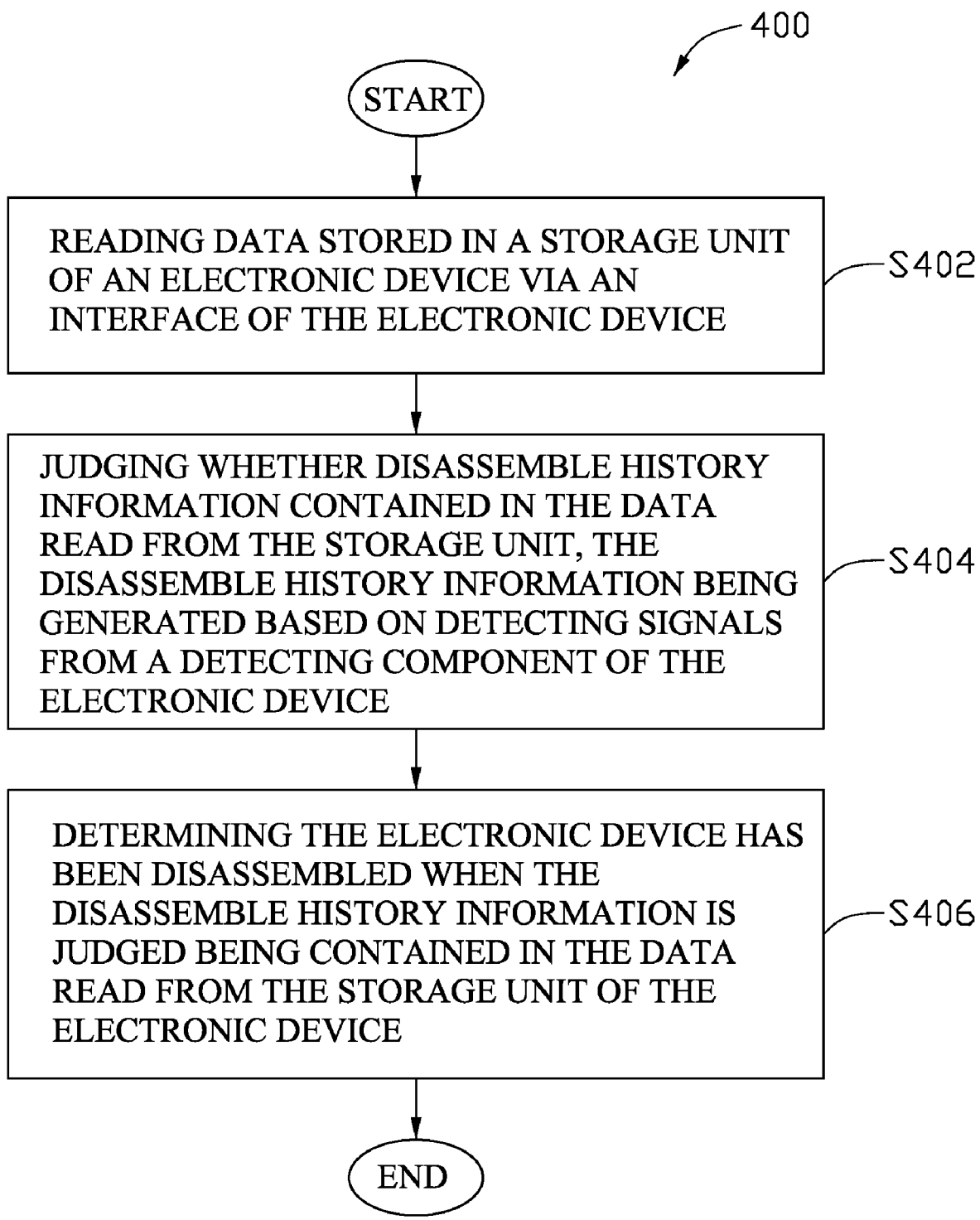
FIG. 10 is a flow chart illustrating various actions of a method for recording disassemble history information of an electronic device in accordance with a second exemplary embodiment.

Referring to FIG. 10, a flowchart illustrating a method 400 for judging whether the electronic device 100 has been disassembled or not disassembled is shown. The method 400 includes the following blocks.

At block S402, another electronic device coupled to the electronic device 100 reads data stored in the storage unit 150 of the electronic device 100 via the interface 310 of the electronic device 100.

At block S404, the another electronic device judges whether disassemble history information is contained in the data read from the storage unit 150 of the electronic device 100. The disassemble history information is generated based on detecting signals from the detecting component 140 of the electronic device 100.

At block S406, the another electronic device determines the electronic device 100 has been disassembled when the disassemble history information is judged being contained in the data read from the storage unit 150 of the electronic device 100.

As described above, the electronic device 100 is capable of recording disassemble history information in the storage deice 150 when a disassemble action is detected by the detecting component 140. As such, manufacturers or dealers can use the disassemble history information to determine whether the electronic device 100 has been disassembled or not.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An electronic device, comprising:
a detecting component configured to detect whether the electronic device has been disassembled or not, the detecting component generating detecting signals when the electronic device being detected has been disassemble, wherein the detecting signal is generated when the electronic device is disassembled, not after the electronic device has been detached;
an encoding unit operatively connected to the detecting component, the encoding unit configured to receive the detecting signals, encode the detecting signals according to a predetermined algorithm, and generate a disassemble history information correspondingly indicating the electronic device has been disassembled; and
a storage unit operatively connected to the detecting component, the storage unit configured to store the disassemble history information.

2. The electronic device according to claim 1, wherein the detecting component is a push switch, and when the electronic device is disassembled the push switch is actuated from a first state to a second state, so as to cause pulse signals to be generated and transmitted to the storage unit.

3. The electronic device according to claim 2, further comprising a first housing and a second housing capable of being detachably assembled together, wherein the push switch is disposed in a receiving cavity defined in one of the first housing or the second housing.

4. The electronic device according to claim 3, further comprising a coil spring, when the first housing and the second housing are assembled, the coil spring being compressed by the push switch to store elastic energy; when the first housing and the second housing are disassembled, the coil pushing the push switch to change from the first state to the second state.

5. The electronic device according to claim 1, wherein the detecting component is a coil, the electronic device further comprising a screw, the screw being inserted into the coil when the electronic device is assembled, the coil generating inductive signals when the electronic device is disassembled by moving the screw out of the coil.

6. The electronic device according to claim 5, further comprising:
an interface configured to output the disassemble history information read from the storage unit.

7. A method for recording disassemble history information of an electronic device, the method comprising:
generating detecting signals in response to a disassemble action with respect to the electronic device for separating the electronic device into at least two portions, wherein the detecting signal is generated when the electronic device is disassembled, not after the electronic device has been detached
receiving detecting signals from a detecting component in response to the disassemble action with respect to the electronic device;
encoding the detecting signals received from the detecting component according to a predetermined algorithm and generating a disassemble history information correspondingly indicating the electronic device has been disassembled; and
storing the disassemble history information.

8. The method according to claim 7, further comprising:
transmitting out the disassemble history information from an interface of the electronic device.

9. The method according to claim 7, wherein the action of generating detecting signals in response to a disassemble action with respect to the electronic device for separating the electronic device into at least two portions further comprises:

generating pulse signals from a push switch of the electronic device in response to the disassemble action for actuating the push switch from a first state to a second state.

10. The method according to claim 7, wherein the action of generating detecting signals in response to a disassemble action with respect to the electronic device for separating the electronic device into at least two portions further comprises:

generating inductive signals from a coil of the electronic device in response to a disassemble action for moving a screw out of the coil, wherein the screw is inserted into coil when the electronic device is assembled.

11. A method for judging whether an electronic device has been disassembled or not, the method comprising:

reading data stored in a storage unit of the electronic device via an interface of the electronic device;

judging whether disassemble history information is contained in the data read from the storage unit of the electronic device, the disassemble history information being stored in the storage unit based on detecting signals indicating the electronic device is being disassembled received from a detecting component of the electronic device, wherein the detecting signals received are encoded according to a predetermined algorithm; and determining the electronic device has been disassembled when the disassemble history information contains disassembled information in the data read from the storage unit of the electronic device.

12. The method according to claim 11, wherein the disassemble history information is stored in the storage unit based on pulse signals from a push switch of the electronic device in response to the disassemble action for actuating the push switch from a first state to a second state.

13. The method according to claim 11, wherein the disassemble history information is stored in the storage unit based on inductive signals from a coil of the electronic device in response to a disassemble action for moving a screw out of the coil, wherein the screw is inserted into coil when the electronic device is assembled.

14. The method according to claim 11, wherein the action of reading data stored in a storage unit of the electronic device via an interface of the electronic device further comprising:

reading data stored in a storage unit of the electronic device via a universal serial bus (USB) interface.

15. The method according to claim 11, wherein the action of reading data stored in a storage unit of the electronic device via an interface of the electronic device further comprising:

reading data stored in a storage unit of the electronic device via a Bluetooth wireless interface.

* * * * *